(12) United States Patent
Haffenden et al.

(10) Patent No.: US 11,661,930 B2
(45) Date of Patent: May 30, 2023

(54) PULSATION DAMPER

(71) Applicant: Aspen Pumps Limited, Hailsham (GB)

(72) Inventors: Gary Haffenden, Hailsham (GB); Christopher Forshaw, Hailsham (GB); Christopher Gee, Hailsham (GB)

(73) Assignee: Aspen Pumps Limited, Hailsham (GB)

( * ) Notice: Subject to any disclaimer, the term of this patent is extended or adjusted under 35 U.S.C. 154(b) by 289 days.

(21) Appl. No.: 16/762,194

(22) PCT Filed: Oct. 25, 2018

(86) PCT No.: PCT/GB2018/053095
§ 371 (c)(1),
(2) Date: May 7, 2020

(87) PCT Pub. No.: WO2019/092396
PCT Pub. Date: May 16, 2019

(65) Prior Publication Data
US 2020/0362844 A1 Nov. 19, 2020

(30) Foreign Application Priority Data

Nov. 10, 2017 (GB) ...................................... 1718626

(51) Int. Cl.
*F04B 11/00* (2006.01)
*F16L 55/052* (2006.01)
(Continued)

(52) U.S. Cl.
CPC .......... *F04B 11/0025* (2013.01); *F04B 11/00* (2013.01); *F04B 11/0091* (2013.01);
(Continued)

(58) Field of Classification Search
CPC .............. F04B 11/0025; F04B 11/0091; F04B 39/0055; F15B 2201/305; F16L 55/04;
(Continued)

(56) References Cited

U.S. PATENT DOCUMENTS

| 2,256,370 A | | 9/1941 | Adams | |
| 2,636,506 A | * | 4/1953 | St Clair | .................. F16L 55/07 137/549 |

(Continued)

FOREIGN PATENT DOCUMENTS

| CH | 706402 A2 | 10/2013 |
| CH | 706444 A2 | 10/2013 |

(Continued)

OTHER PUBLICATIONS

International Search Report for Application No. PCT/GB2018/053095 dated Dec. 12, 2018, 6 pages.

(Continued)

*Primary Examiner* — Robert K Arundale
*Assistant Examiner* — Richard K. Durden
(74) *Attorney, Agent, or Firm* — Seyfarth Shaw LLP (57) ABSTRACT

A pulsation damper for a condensate pump comprising a housing defining a fluid chamber having a liquid inlet connectable to an outlet of the condensate pump, an air inlet, and a liquid outlet, wherein the air inlet includes a one-way valve configured to selectively introduce air into the housing to maintain a first air pocket within the fluid chamber as liquid flows through the fluid chamber, wherein the liquid outlet is located outside the first air pocket, and wherein the air pocket is configured to dissipate pulsations within liquid entering the housing at the liquid inlet prior to the liquid discharging via the liquid outlet.

18 Claims, 6 Drawing Sheets

(51) Int. Cl.
  *F16L 55/04* (2006.01)
  *F04B 39/00* (2006.01)
(52) U.S. Cl.
  CPC .............. *F16L 55/04* (2013.01); *F16L 55/052* (2013.01); *F04B 39/0055* (2013.01)
(58) Field of Classification Search
  CPC ......... F16L 55/05; F16L 55/052; F16L 55/07; Y10T 137/3021; Y10T 137/3037; Y10T 137/3115; Y10T 137/3118; Y10T 137/3127; Y10T 137/3149; Y10T 137/731; Y10T 137/86043; Y10T 137/86381
  See application file for complete search history.

(56) References Cited

U.S. PATENT DOCUMENTS

| | | | |
|---|---|---|---|
| 2,896,862 A * | 7/1959 | Bede | F04B 11/0025 137/565.34 |
| 2,905,200 A | 9/1959 | Guier et al. | |
| 3,889,705 A * | 6/1975 | Coderre | F16L 55/04 137/577 |
| 4,514,151 A | 4/1985 | Anders | |
| 4,590,796 A * | 5/1986 | Baatz | G01F 1/72 73/114.42 |
| 4,793,775 A * | 12/1988 | Peruzzi | F04B 39/0055 417/313 |
| 4,929,157 A * | 5/1990 | Steele | F04B 27/1036 417/312 |
| 5,307,782 A | 5/1994 | Davis | |
| 5,372,116 A | 12/1994 | Davis | |
| 5,921,261 A * | 7/1999 | Erickson | G05D 16/2095 251/30.02 |
| 6,119,728 A * | 9/2000 | Seidel-Peschmann | F16L 55/04 138/44 |
| 6,227,242 B1 * | 5/2001 | Kleppner | B60K 15/077 137/565.17 |
| 7,381,032 B2 * | 6/2008 | Osaka | F04B 39/0055 181/249 |
| 7,469,682 B2 * | 12/2008 | Anderson | F02M 69/54 123/514 |
| 2009/0188574 A1 * | 7/2009 | Eck | F02M 37/44 137/565.17 |
| 2014/0345968 A1 * | 11/2014 | Pirovano | F04B 39/0055 181/212 |
| 2015/0096640 A1 * | 4/2015 | Condon | F16L 55/053 138/31 |
| 2017/0356433 A1 * | 12/2017 | Doi | F04B 39/0055 |
| 2017/0356556 A1 * | 12/2017 | Canatella | F16K 27/0209 |

FOREIGN PATENT DOCUMENTS

| | | |
|---|---|---|
| EP | 0561502 A1 | 9/1993 |
| EP | 2110594 A1 | 10/2009 |

OTHER PUBLICATIONS

Written Opinion for Application No. PCT/GB2018/053095 dated Dec. 12, 2018, 9 pages.
Combined Search and Examination Report for Application No. GB 1718626.3 dated Apr. 20, 2018, 7 pages.

* cited by examiner

PULSATION DAMPER

CROSS REFERENCE TO RELATED APPLICATIONS

This is a National Stage application of, and claims priority to, PCT/GB2018/053095, filed Oct. 25, 2018, which further claims priority to GB Patent Application No. 1718626.3, filed Nov. 10, 2017, the disclosures of which are incorporated herein by reference in their entirety.

This invention relates to a pulsation damper, in particular but not exclusively, a pulsation damper for dampening pulsations in fluids flowing within reciprocating pump systems.

BACKGROUND

Condensate pumping systems will typically vibrate during operation. This is due to movements of a pump motor (typically a reciprocating piston pump, the reciprocating action of which generates pressure waves at the motor outlet). These pressure waves travel down a discharge pipe and cause high frequency oscillations of the discharge pipe. Aside from mechanical wear and damage of any equipment connected to or near the discharge pipe, the oscillations in the discharge pipe can cause significant noise to be produced as it rattles against equipment in contact with the discharge pipe. Casings or housings for the discharge pipe can act as an amplifier of noise, which is undesirable, particularly in systems that are intended for indoor use.

One solution to this problem is to apply a pulsation damper. Pulsation dampers typically use a compressible bladder or diaphragm to dissipate the pressure waves generated by the pump motor outlet. Alternative arrangements known in the art include dispersion systems that use a series of walls to disperse the pressure wave to create a smooth liquid flow. However, such prior art systems are complicated to manufacture and require additional equipment, such as compressed air cylinders in the case of bladder pulsation dampeners, to operate.

Such equipment can also take up considerable space which is particularly undesirable if a pulsation damper is to be used with an indoor system, such as an air conditioner or refrigerator, where space may be at a premium. Indoor systems that require condensate pumps to pump liquid to enable the respective systems to operate need to operate discretely and with minimal additional equipment due to space constraints. Typically, a pulsation damper is located as close as possible to the source of vibrations in a system. In the case of air conditioning or refrigeration systems, this will be the condensate pump. As such, the pulsation damper is located as close as possible to the condensate pump motor, which is not practical if additional equipment has to be installed next to an indoor air conditioning system. By dissipating pulsations in the liquid prior to discharging the liquid, vibrations in the discharge pipe due to the pulsations are largely eliminated. This makes for an easier installation of the condensate pumping system, as it is no longer essential to route the discharge pipe away from any adjacent equipment that the pipe might have rattled against.

The described embodiments of the present invention seek to address these problems.

BRIEF SUMMARY OF THE DISCLOSURE

Viewed from a first aspect, the present invention provides a pulsation damper for a condensate pump comprising a housing defining a fluid chamber having a liquid inlet connectable to an outlet of the condensate pump, an air inlet, and a liquid outlet, wherein the air inlet includes a one-way valve configured to selectively introduce air into the housing to maintain a first air pocket within the fluid chamber as liquid flows through the fluid chamber, wherein the liquid outlet is located outside the first air pocket, and wherein the air pocket is configured to dissipate pulsations within liquid entering the housing at the liquid inlet prior to the liquid discharging via the liquid outlet. This creates a pulsation damper that has no moving parts, which is considerably easier to manufacture and maintain compared to existing systems which incorporate bladders or diaphragms.

The pulsation damper may comprise at least one dividing wall protruding from an inner surface of the housing defining a first region and a second region within the fluid chamber.

The first region may contain a mix of liquid and the first air pocket. The liquid inlet may be located within the first region. Where a second region is present in the fluid chamber, the second region may contain a second air pocket. By creating a second air pocket, the present damper is able to remain effective, even if air from the first air pocket is removed during operation. This may occur in flow systems with high pressure heads.

The wall of the liquid outlet may form a portion of the dividing wall.

The pulsation damper may comprise a damper element connected to the liquid inlet and projecting into the fluid chamber, forming a dampening fluid inlet channel.

The dampening fluid inlet channel may have a tapered internal profile where the internal profile tapers in the direction of the liquid flow. The tapered internal profile may have a taper angle of 7-degrees. By incorporating a tapered internal profile, the present damper is able to reduce the pulsations in the fluid as the fluid enters the liquid chamber, further increasing the effectiveness of the damper.

The damper element may be connected to the air inlet, whereby to form an air inlet channel extending into the fluid chamber.

The pulsation damper may comprise a deformable conduit connected to the liquid inlet. The deformable conduit is configured to dissipate vibrations from the condensate pump. The deformable conduit is formed of a first flexible body segment having a first longitudinal axis and a second flexible body segment having a second longitudinal axis. The first and second longitudinal axes may be noncolinear. The liquid inlet of the bottom wall may be a barbed structure. Inclusion of a deformable conduit at the liquid inlet provides an additional layer of anti-vibration dampening, as vibrations in the pump motor will not be transmitted down the discharge line and cause rattling of the discharge line against surrounding equipment. The design of the deformable conduit is such that it absorbs vibrations from the pump motor before they reach the liquid chamber.

The deformable conduit may comprise an extending member having a protrusion connected to the air inlet, whereby to extend the air inlet channel away from an external surface of the housing. The protrusion may contain a flap valve located within the air inlet channel. This is advantageous, as the flap valve has been developed to reduce the sound created when air is introduced via the one-way valve.

The liquid inlet may be offset from the liquid outlet. The liquid inlet may terminate above the liquid outlet. This offset configuration provides a further dissipation mechanism within the liquid chamber, as the fluid flow path from the liquid inlet to the liquid outlet is not a straight line, which would have allowed some of the pulsations to be discharged from the damper.

The one-way valve may be a duck-billed valve.

The bottom wall may be secured to the chamber housing by a series of mechanical fastenings. The mechanical fastenings may be any of interleaving protrusions or cantilevered connections between the bottom wall and housing walls.

BRIEF DESCRIPTION OF THE DRAWINGS

Embodiments of the invention are further described hereinafter with reference to the accompanying drawings, in which.

DETAILED DESCRIPTION

The present invention seeks to provide a pulsation damper which requires minimal installation and maintenance effort while reducing the vibrations in a discharge line downstream of a reciprocating pump motor. The present invention achieves this by trapping a pocket of air within a liquid chamber. Deliberately incorporating a small amount of air in the liquid chamber causes the liquid to effectively become compressible within the chamber, which allows the air to absorb the pressure pulses before the liquid is discharged as a smooth liquid flow. This is significantly advantageous over prior art systems, as there is no need for compressed air equipment or a complicated series of deflector walls within the chamber. This enables the present pulsation dampener to be used in confined spaces and installed with minimal effort.

Figure 1:
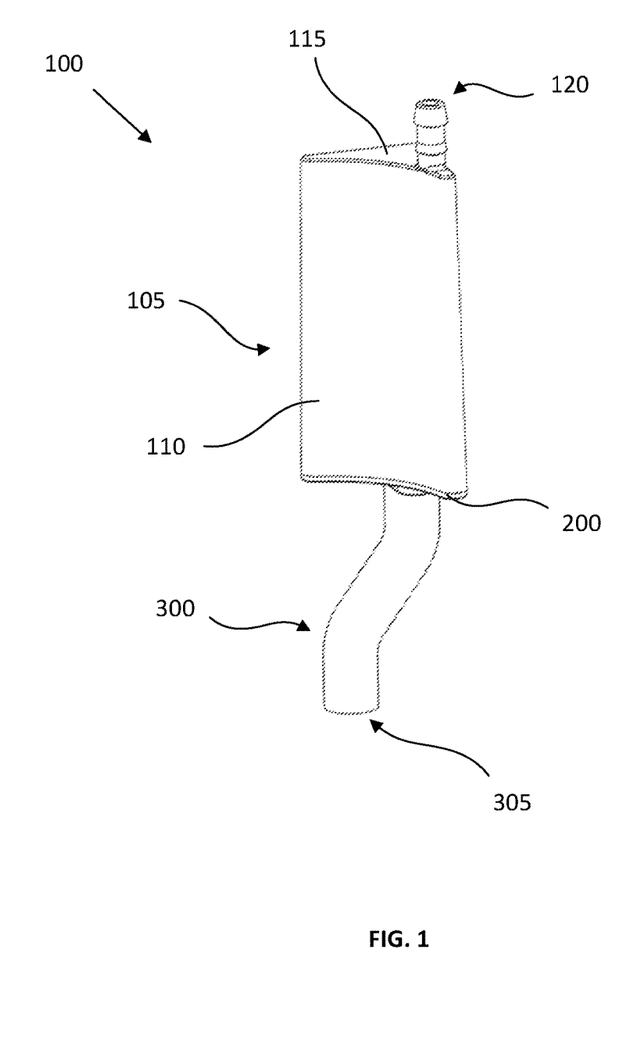
FIGS. 1 and 2 show respective top and bottom perspective views of a pulsation damper according to aspects of the invention.
Figure 2:
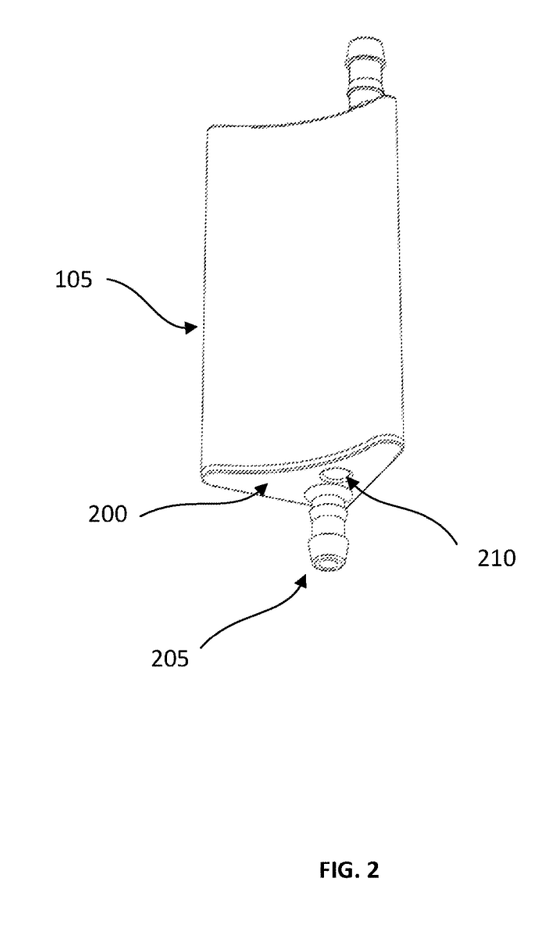

FIGS. 1 and 2 show respective top and bottom perspective views of a pulsation damper according to aspects of the invention. The pulsation damper 100 comprises a housing defining a liquid chamber 105. As shown in the Figures, the housing is formed of an outlet wall 115 located at the top of the damper 100, an inlet wall 200 located at the bottom of the damper 100 and three side walls 110 in between the outlet wall 115 and inlet wall 200. It should be noted that although a liquid chamber is referred to, it would be clear that the liquid chamber may include air.

Figure 5:
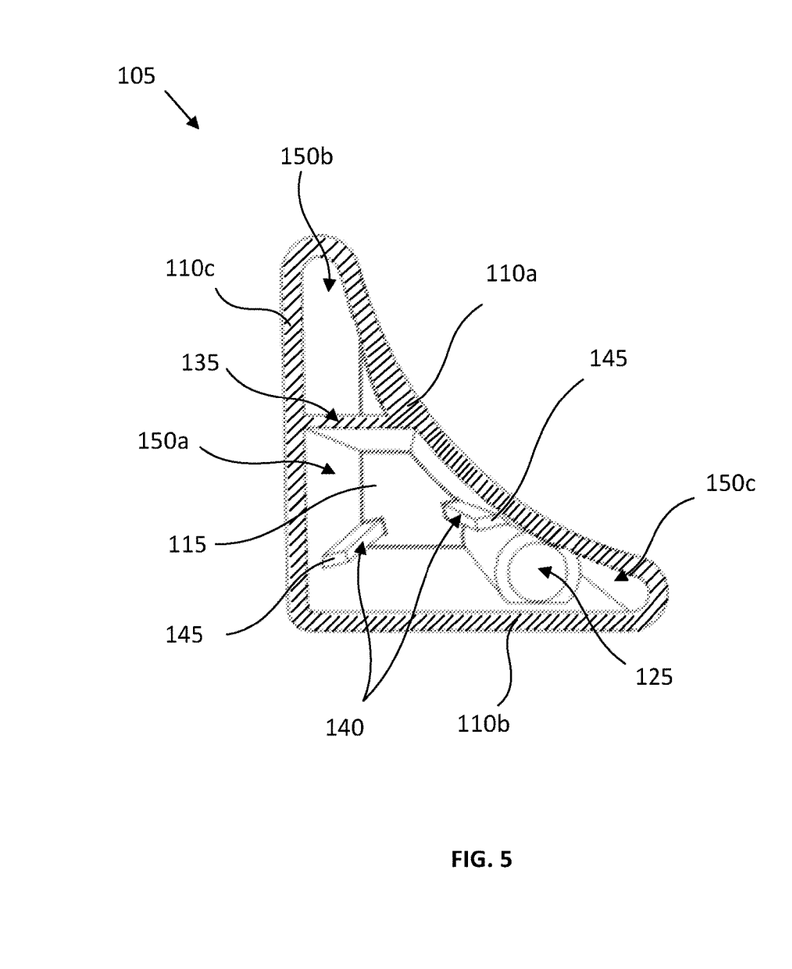
FIG. 5 shows an underside section view of a liquid chamber of the pulsation damper.
Figure 10:
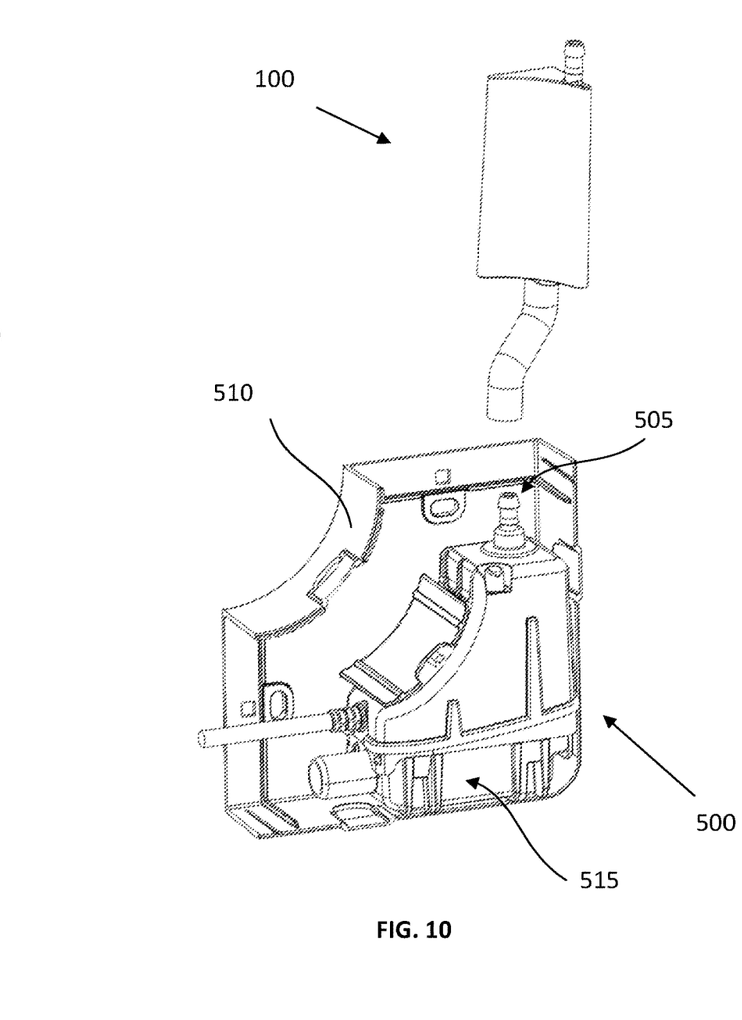
FIG. 10 shows an exploded view of the pulsation damper and condensate pump.
Figure 11:
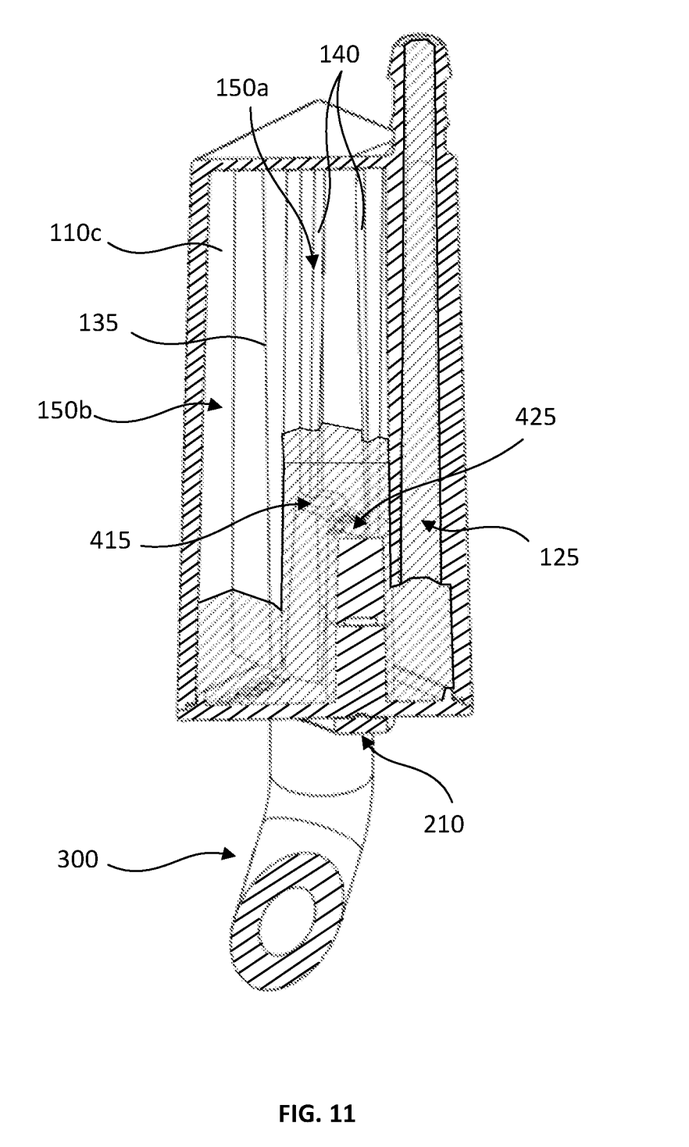
FIG. 11 shows an overview of an interior of the pulsation damper.

As shown in FIGS. 1 and 2 and with reference to FIGS. 5 and 10, one of the side walls 110*a* is concavely curved and the two other side walls 110*b*, 110*c* are straight. Side walls 110*b* and 110*c* meet at 90° and extend to opposed ends of the curved side wall 110*a*. The inlet wall 200 includes a liquid inlet 205 in the form of a barbed male member configured to connect to a deformable conduit 300. The bottom wall 200 also includes an air inlet 210 extending from the bottom wall 200 into the fluid chamber 105 and terminates with a duck-billed valve 240. The outlet wall 115 is shown with a liquid outlet 120 in the form of a barbed male member. The liquid outlet 120 is configured to connect to a discharge pipe to discharge condensate liquid from a condensate pump system 500. The pulsation damper 100 is located downstream of the condensate pump system 500 and in close proximity to a pump motor (not shown) and is connected to a pump motor outlet 505 by the deformable conduit 300. The pulsation damper 100 receives liquid from the pump motor outlet 505 and dissipates the pulsation in the liquid chamber 105 before discharging the liquid through the chamber outlet 120 located in the top surface 115 of the liquid chamber 105. While a duck-billed valve 240 is shown in the Figures, it would be appreciated that other one-way valves compatible with the present damper would be included by this description. While the liquid inlet 205 and liquid outlet 120 are shown as barbed male members, it would be appreciated that other configurations of liquid inlet would be equally compatible with the present damper. While the liquid inlet 205 is formed as part of the bottom wall 200, this is not essential and the liquid inlet 205 may be formed in any of the walls of the housing 105. Similarly, the liquid outlet 120 may be formed in any of the walls of the housing 105.

Figure 3:
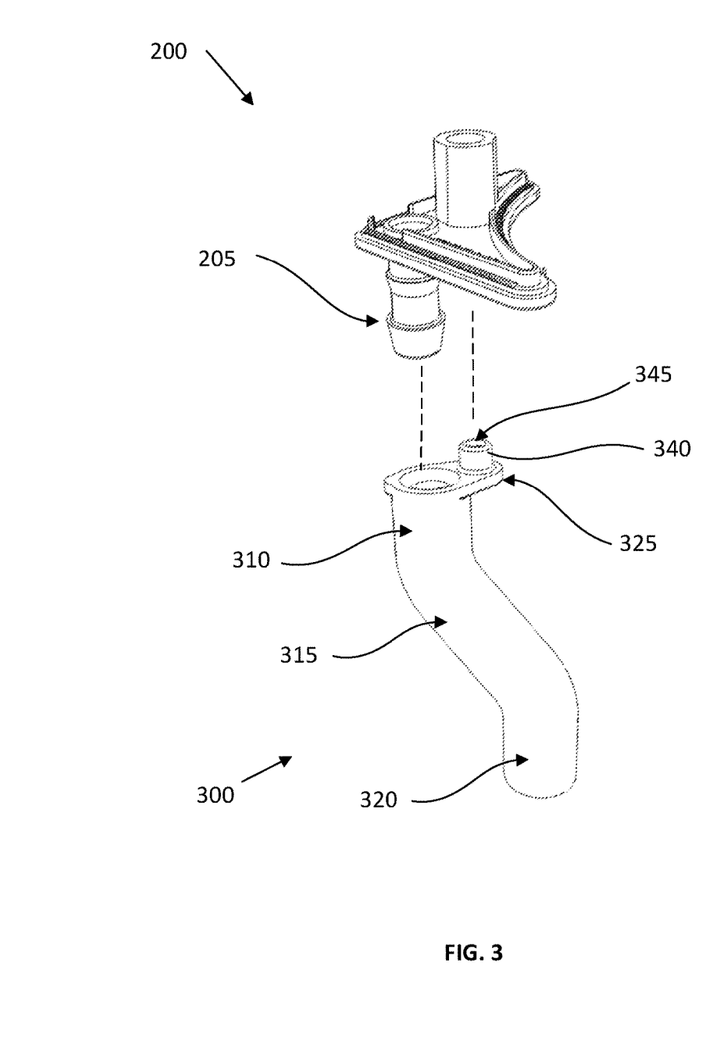
FIG. 3 shows an exploded view of a bottom wall member and deformable conduit of the pulsation damper.

As shown in FIG. 3, the inlet wall 200 is securely connected to the pump motor using a liquid inlet 205 configured as a barbed member extending from surface 215 away from the chamber 105. The liquid inlet 205 can be considered to form a liquid inlet channel that extends through the deformable conduit 300. The flexible conduit 300 receives the liquid inlet 205 and is secured by the barbed configuration of the liquid inlet 205. The bottom wall 200 is shown with air inlet 210.

As best shown in FIG. 3 and with reference to FIG. 10, the deformable conduit 300 is configured to dissipate vibrations from the condensate pump 500. The deformable connector 300 is preferably formed of three segments 310, 315, 320 which create a dog-legged configuration and is configured to receive the outlet of the pump motor 505. This is particularly advantageous as it allows the oscillations of the pump motor (not shown) to be absorbed by the deformable connector 300 rather than transmitted to the pulsation damper system 100 and any surrounding pipework or casings, as would be the case with a straight and/or rigid connector. To enhance this effect, the connector 300 is more flexible in bending than it is in compression or torsion. However, more or fewer than three segments may be used to achieve this effect. The connector 300 also comprises a connecting member 325 which extends laterally with respect to the axis of the inlet 205 and which includes an air inlet protrusion 340 extending parallel to but laterally offset from the inlet 205 axis. The protrusion 340 is received by the air inlet 210 of the bottom wall 200 and is shown including a bore 345 which extends through the air inlet protrusion 340 to provide a source of air to the pulsation damper 100.

Figure 4:
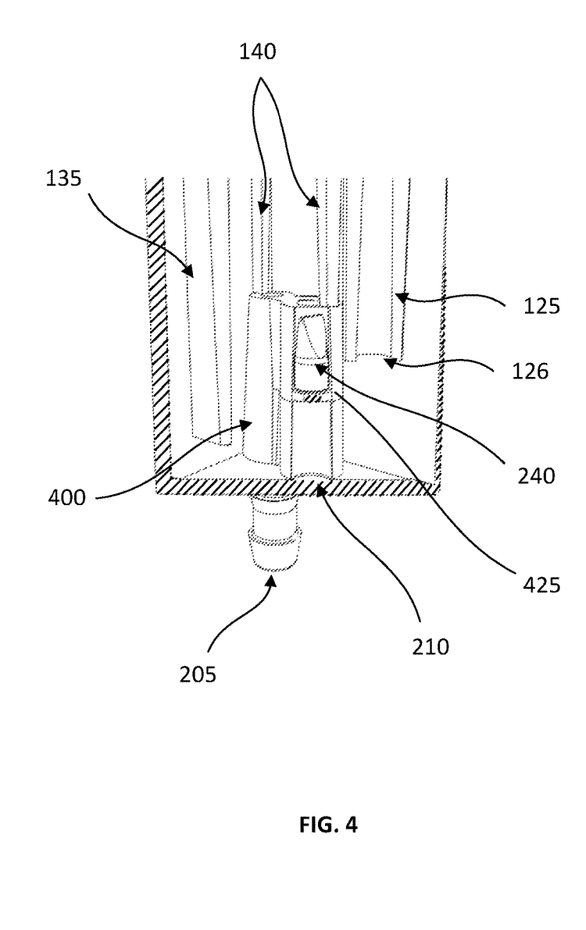
FIG. 4 is a cross-sectional view showing internal components of the pulsation damper.

The internal configuration of the liquid chamber is best shown in FIGS. 4 and 5. The chamber walls 110, top surface 115 and bottom surface 200 define the internal volume of the liquid chamber 105. Dividing wall 135 creates an inner or central region 150*a* and an outer region 150*b*. A further outer region 150*c* is created by the walls of chamber outlet channel 125 extending into the chamber 105. The central region 150*a* contains a mix of air and liquid from the pump motor, whereas the outer regions 150*b*, 150*c* primarily contain air. As shown in the Figures, the closest surface pulsations within the liquid could reflect off is the top surface 115, which is 48 mm away from the termination of the top surface 410 of the damper 400 in the arrangement illustrated. There is a chance that air from the central region 150a will be displaced and lost through the chamber outlet channel 125 which would reduce the effectiveness of the damper 100. High pressure heads in the system may exacerbate this problem. To account for this, the greater volume of air in the outer regions 150b, 150c are not affected by the incoming liquid flow and allow the dampener system to remain effective.

Figure 6:
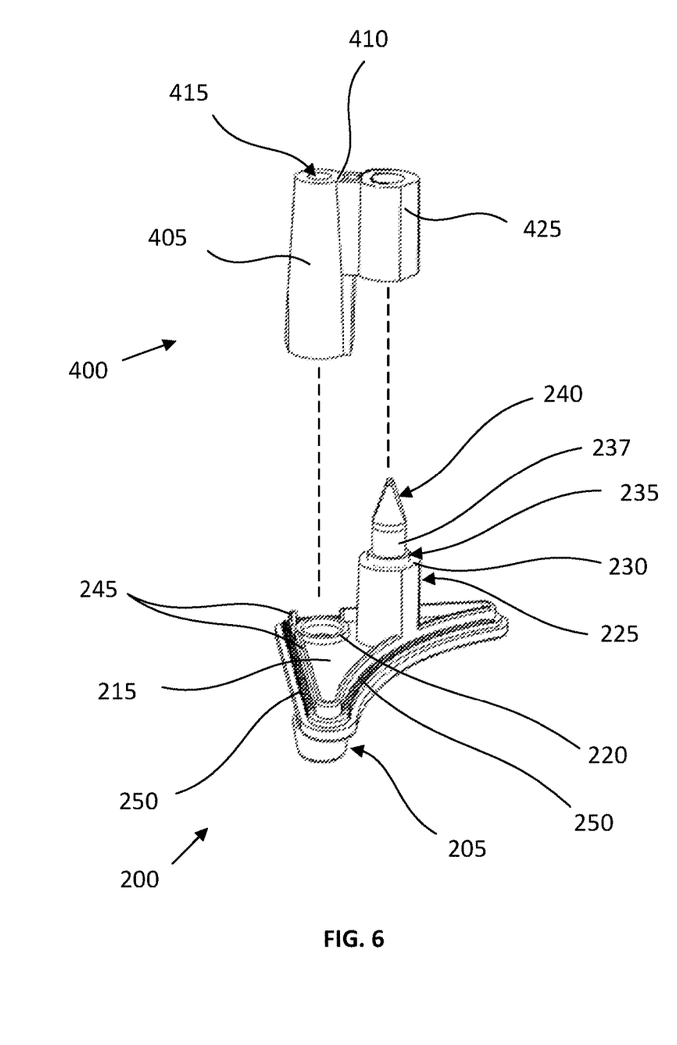
FIG. 6 shows an exploded view of the bottom wall member and an associated damper.
Figure 7:
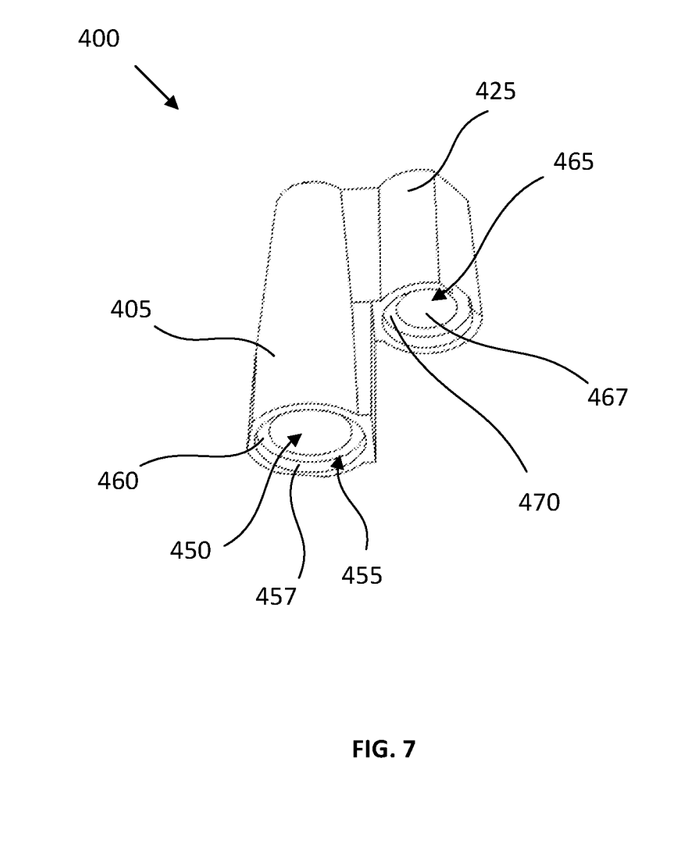
FIG. 7 shows an underside perspective view of the damper.

As shown in FIGS. 4 and 6, the liquid chamber 105 is held firmly in place against the inlet wall 200 by multiple mechanical engaging elements 245, 250. This ensures the inlet wall 200 is held securely against the liquid chamber 105 and prevents liquid contained within the chamber 105 from seeping or leaking out. The mechanical elements include cantilever clips and a series protruding of elements designed to fit into corresponding grooves within the chamber side wall 110 (not shown). The force holding the chamber 105 against the inlet wall 200 also causes the lower face 145 of the dividing walls 140 to press down onto the upper surface 410 of the damper 400 which firmly holds the damper 400 against the inlet wall 200 which enhances the seals created between the inlet wall 200 and the damper 400 described in greater detail below.

Figure 8:
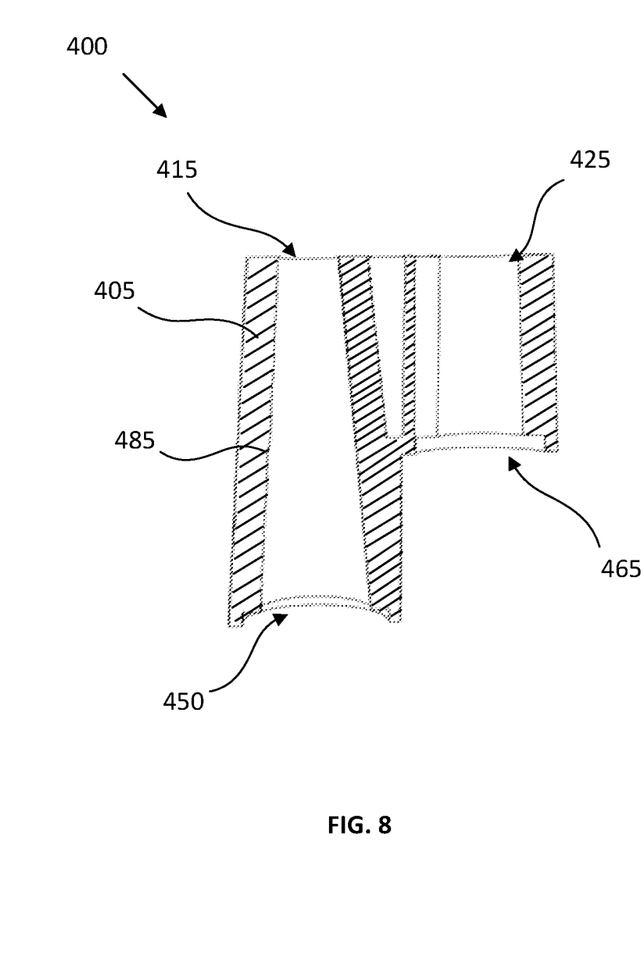
FIG. 8 shows a side section view of the damper.

The features of the present invention that provide the damping effect are best illustrated in FIGS. 4 to 8. Liquid is introduced into the chamber 105 via the pulsation dampening channel 405 of the damper element 400. As liquid is pumped from the liquid inlet 205 of the bottom wall 200 through the dampening channel 405 of the damper 400, the trapped air bubble within the liquid chamber compresses and absorbs the incoming pulsation and reduces the pressure perturbations in the discharge line. As can be seen in FIG. 8 the dampening channel 405 has a tapered internal surface 485. This tapered internal surface 485 is configured specifically to aid the damping effect of the present system. As shown, the dampening channel 405 approximates a conical frustum. The inner surface 485 has a taper angle of 7 degrees, narrowing downstream or in the direction of liquid flow, and the liquid channel outlet 415 has an internal diameter of 3.5 mm. This combination is found to be particularly effective at damping the pulsations caused by condensate pumps used in air conditioning and refrigeration systems. However, configurations with larger or smaller diameters that incorporate the taper angle of 7 degrees will also benefit from the reduction in pulsation. The chamber outlet channel 125 extends into the chamber 105 such that the outlet port 126 of the outlet channel 125 within the chamber 105 is located below the upper surface 410 of the damper 400. As shown, the upper surface 410 of the damper 400 is offset by 21 mm from the bottom surface 215 and the inlet port 126 of the chamber outlet channel 125 of the chamber fluid outlet is offset 13.5 mm from the bottom surface 215. This sets the initial water level in the liquid chamber 105, but during operation the water level will be dependent on the pressure head within the chamber 105. When the damper element 400 is fitted to the bottom wall 200, a continuous liquid channel is formed by the deformable conduit 300 and the liquid dampening channel 405 of the damper element 400. By terminating the liquid inlet channel 405 above the inlet of the liquid outlet channel 125, it is possible to direct liquid entering the chamber 105 towards the first air pocket. Arranging the liquid inlet 205 and outlet 125 in the offset manner described above ensures the fluid flow path between the liquid inlet 205 and liquid outlet 125 is not a straight line and that the hydraulic continuity of the liquid entering the chamber 105 is broken. This causes any pulsations remaining in the liquid to be dampened, substantially reducing any vibrations within the liquid being transmitted downstream. While the liquid outlet channel 125 may pass through the air pocket, the inlet port 126 of the liquid outlet 125 must remain outside the air pocket so that the damper 100 can function. The first and second air pockets are intended to remain in the chamber throughout the life of the vibration damper 100. This is achieved by the arrangement of the internal components within the chamber 105. However, in some instances it may be necessary to replenish either or both of the first and second air pockets. While the air inlet 210 will replenish the air pockets during normal operation, when there is a high pressure head within the chamber 105, the air inlet may remain shut due to the pressure within the chamber 105 being greater than ambient. In this case, air can be introduced into the chamber 105 by controlling the condensate pump 500 such that the liquid level within the condensate reservoir 515 (see FIG. 10) of the condensate pump 500 is lowered below the level of the pump motor inlet (not shown) of the condensate pump 500. This would cause air to be drawn into the chamber 105 and replenish the air pockets. As starting the pump motor from a 'dry' state is undesirable, this function may be controlled by a timer on board the microprocessor within the condensate pump to ensure the pump motor is only introducing air for the minimum period of time required to replenish the air pockets.

In operation, a reciprocating motor generates cycles of positive and negative pressure gradients at the motor outlet, which can cause liquid to be drawn back upstream, which may cause some of the liquid to leak out of the housing 105. The present pulsation damper 100 incorporates multiple mechanical features to prevent back flow of liquid out of the bottom wall 200. A collar 220 extending from the base 215 is received by a corresponding recess 455 in the liquid channel 405. The collar 220 has outer and upper surfaces which engage with the inner surface 457 of the recess 455 and surface 460 around the liquid inlet 450. By holding the bottom wall 200 securely against the chamber 105, these surfaces remain firmly in contact, creating a seal preventing the back flow of liquid out of the bottom wall 200.

Air is introduced to the chamber 105 through air inlet 210 in the bottom wall 200 which passes through air inlet extrusion 225 extending from the base 215 in an inward direction. A bore (not shown) extends through the length of the air inlet extrusion 225 from the top surface 230 to the air inlet 210 and is configured to receive the shoulder 235 of the duck-billed valve 240. The duck-billed valve 240 is also received by a first opening 465 of the air channel 425 of the damper element 400. The air inlet 210 is used to replenish the trapped air pocket within the chamber 105, as some of the trapped air may be discharged with the liquid being pumped out of the chamber 105. While the air inlet 210 is shown separate to the liquid inlet 205, it would be possible to incorporate the air inlet 210 into the liquid inlet 205. Similarly, it would be possible to introduce air into the liquid passing through the deformable conduit 300. Where air is introduced into the liquid entering the liquid chamber, it would be understood that air mixed with liquid would be introduced into the liquid chamber, which would be equally effective at providing and maintaining the first air pocket within the liquid chamber.

Liquid is prevented from flowing back through the damper air channel 425 by a series of seals. Firstly, the shoulder 235 of the duck-billed valve 240 is secured by a press fit within the bore of the air inlet extrusion 225. Secondly, the surface 237 connecting the duck-billed valve 240 to its shoulder 235 engages with the inner surface 467 of the air channel 425 to form a seal. Thirdly, the top surface of the shoulder 235 engages with the lower surface 470 of the air channel 425 to provide a final seal. Finally, the duck-billed valve 240 is arranged such that the weight of water over the valve will cause the valve to press shut. These features work in combination to prevent liquid leaking back through the air channel 425. The pressure exerted by the dividing walls 140 onto the damper 400 enhances the seals created in the air channel 425.

Aside from the pulsation dampening effects described above, the duck-billed valve 240 has the added functionality of acting as an anti-siphoning device. This alleviates the need to have a separate anti-siphoning device located along the discharge line, as is typically the case in such systems. The siphoning effect occurs when the liquid outlet of the system is located below the height of the pump motor. In this case the liquid downstream of the pump generates a pressure head across the non-return valve of the pump motor. As the non-return valve only requires minimal pressure to open, the weight of the liquid retained in the condensate pump motor is sufficient to cause some seepage through the non-return valve. Eventually, this can result in the internal chamber of the pump motor becoming dry as all of the liquid is siphoned through the valve. If this happens, the pump motor may start up "dry" which can generate significant noise and wear of the internal components. To avoid this, an anti-siphoning device, typically an air valve, can be incorporated downstream of the pump motor. This allows the outlet of the discharge line to be located lower than the pump motor, as the anti-siphoning device will open and prevent any pressure head from building up due to the liquid retained in the discharge line downstream of the pump. The negative pressure gradient caused by the pressure head in the discharge line causes the duck-billed valve 240 to open and neutralise the pressure head, preventing the pump motor from being siphoned "dry" and therefore prolonging the life of the motor.

Figure 9:
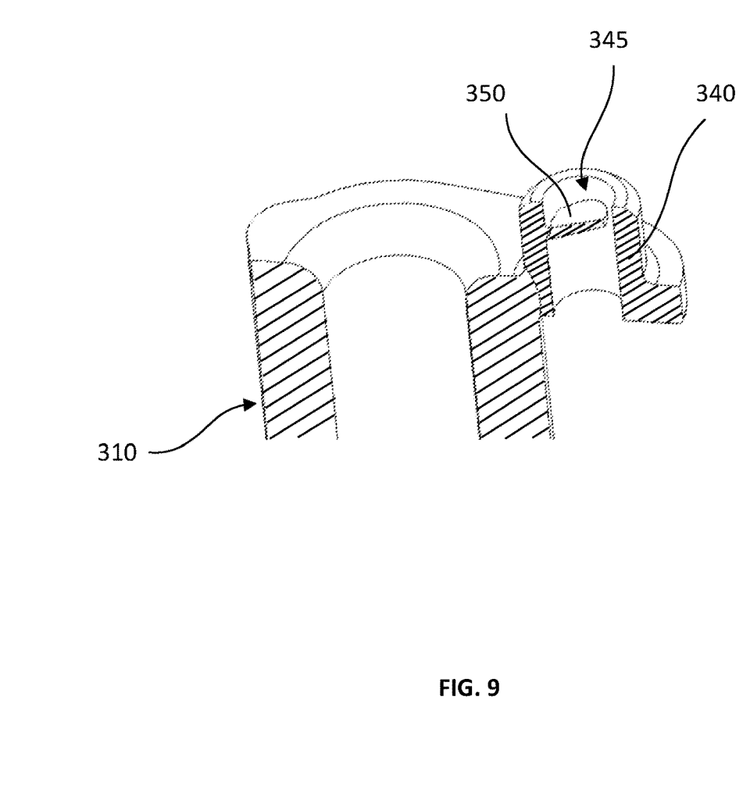
FIG. 9 shows a side section view of a portion of the deformable conduit.

In addition to the duck-billed valve 240 acting as an anti-siphoning device, the air inlet protrusion 340 has been further designed to reduce the "slapping" sound typical of anti-siphoning devices. This is achieved by incorporating a flap valve 350 in the bore 345 of the air inlet extrusion 340, as shown in FIG. 9. The flap valve 350 is designed to substantially reduce the level of noise escaping the bore 345 of the air inlet protrusion 340, while still allowing sufficient air to reach the air outlet valve 240 and enter the air channel 425. When the protrusion 340 is connected to the air inlet 210, the air inlet 210 is extended away from the external surface of the housing 105. When the pulsation damper 100 is assembled, the flap 350 is located in the air inlet 210, which is the preferred arrangement of the present system.

As shown in FIG. 10, the liquid chamber 105 has also been designed to fit within the corner of a vertical section of trunking. The casing 510 used to contain the condensate pump 500 is shown with the front cover removed for clarity. Once installed, the vertical section of trunking would attach to the casing 510 and the condensate pump 500 and pulsation damper 100 would not be visible. This layout uses the existing space around the trunking without compromising the area needed to install the remaining piping of a refrigeration or air conditioning system. The curved side wall 110A of the liquid chamber 105 is one such feature that enables the pulsation dampener 100 of the present invention to occupy minimal space as possible while providing the necessary damping effect. This is also achieved by the chamfered faces of the damper element 400 which have been designed to conform with the geometry of the air inlet extrusion 225, the liquid outlet channel 125 and the curvature of the housing walls 110A.

In addition to occupying minimal space, the present system is designed such that the pulsation dampener system can be installed to the left or right of a high wall split system. This further enhances the flexibility of the present system over existing dampener systems. The deformable connector 300 has been designed to provide a swept angle using the three segments 310, 315, 320, as this allows the system to be installed in left- or right-handed corners of trunking with the same part without any orientation change or additional rotations. This is to say, the pulsation damper 100 is configured such that it can be installed with condensate pumps 500 in a right-handed corner (as shown in FIG. 10) or a left-handed corner (the mirror of what is shown in FIG. 10, with the condensate pump 500 arranged in an 'L' configuration instead of a backward 'L')

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A pulsation damper for a condensate pump having a condensate pump outlet, the pulsation damper comprising:
   a housing defining a fluid chamber having a liquid inlet connectable to the condensate pump outlet, an air inlet, and a liquid outlet; and
   a damper element connected to the liquid inlet and projecting into the fluid chamber to form a dampening fluid inlet channel, wherein the dampening fluid inlet channel has a tapered internal profile that tapers in a direction of liquid flow,
   wherein the air inlet includes a one-way valve adapted to selectively introduce air into the housing to maintain a first air pocket within the fluid chamber as liquid flows through the fluid chamber,
   wherein the liquid outlet is located outside the first air pocket, and wherein the first air pocket is adapted to dissipate pulsations within liquid entering the housing via the liquid inlet prior to the liquid discharging via the liquid outlet.

2. The pulsation damper according to claim 1, further comprising at least one dividing wall protruding from an inner surface of the housing, thereby defining first and second regions within the fluid chamber.

3. The pulsation damper according to claim 2, wherein the first region contains liquid and the first air pocket.

4. The pulsation damper according to claim 2, wherein the liquid inlet is disposed within the first region.

5. The pulsation damper according to claim 2, wherein the second region contains a second air pocket.

6. The pulsation damper according to claim 2, wherein the liquid outlet includes a wall that forms a portion of the dividing wall.

7. The pulsation damper according to claim 1, wherein the dampening fluid inlet channel has a 7-degree taper.

8. The pulsation damper according to claim 1, further comprising a deformable conduit connected to the liquid inlet, wherein the deformable conduit is configured to dissipate vibrations from the condensate pump.

9. The pulsation damper according to claim 8, wherein the deformable conduit is formed of a first flexible body segment having a first longitudinal axis and a second flexible body segment having a second longitudinal axis, and wherein the first and second longitudinal axes are noncolinear.

10. The pulsation damper according to claim 1, wherein the liquid inlet is offset from the liquid outlet.

11. The pulsation damper according to claim 10, wherein the liquid inlet terminates above the liquid outlet.

12. The pulsation damper according to claim 1, wherein the one-way valve is a duck-billed valve.

13. The pulsation damper according to claim 1, wherein a bottom wall of the housing is secured to the housing by a series of mechanical fastenings.

14. The pulsation damper according to claim 13, wherein the mechanical fastenings are any of interleaving protrusions and cantilevered connections between the bottom wall and housing walls.

15. A pulsation damper for a condensate pump having a condensate pump outlet, the pulsation damper comprising:
- a housing defining a fluid chamber having a liquid inlet connectable to the condensate pump outlet, an air inlet, and a liquid outlet; and
- a damper element connected to the liquid inlet and projecting into the fluid chamber to form a dampening fluid inlet channel, wherein the damper element is connected to the air inlet, thereby forming an air inlet channel extending into the fluid chamber,
wherein the air inlet includes a one-way valve adapted to selectively introduce air into the housing to maintain a first air pocket within the fluid chamber as liquid flows through the fluid chamber,
wherein the liquid outlet is located outside the first air pocket, and
wherein the first air pocket is adapted to dissipate pulsations within liquid entering the housing via the liquid inlet prior to the liquid discharging via the liquid outlet.

16. A pulsation damper for a condensate pump having a condensate pump outlet, the pulsation damper comprising:
- a housing defining a fluid chamber having a liquid inlet connectable to the condensate pump outlet, an air inlet, and a liquid outlet, wherein a bottom wall of the housing includes the liquid inlet, and wherein the liquid inlet includes a barbed structure; and
- a damper element connected to the liquid inlet and projecting into the fluid chamber to form a dampening fluid inlet channel,
wherein the air inlet includes a one-way valve adapted to selectively introduce air into the housing to maintain a first air pocket within the fluid chamber as liquid flows through the fluid chamber,
wherein the liquid outlet is located outside the first air pocket, and
wherein the first air pocket is adapted to dissipate pulsations within liquid entering the housing via the liquid inlet prior to the liquid discharging via the liquid outlet.

17. A pulsation damper for a condensate pump having a condensate pump outlet, the pulsation damper comprising:
- a housing defining a fluid chamber having a liquid inlet connectable to the condensate pump outlet, an air inlet, and a liquid outlet;
- a damper element connected to the liquid inlet and projecting into the fluid chamber to form a dampening fluid inlet channel; and
- a deformable conduit connected to the liquid inlet, wherein the deformable conduit is configured to dissipate vibrations from the condensate pump, wherein the deformable conduit includes a connecting member having a protrusion configured to connect to the air inlet, thereby extending the air inlet away from an external surface of the housing,
wherein the air inlet includes a one-way valve adapted to selectively introduce air into the housing to maintain a first air pocket within the fluid chamber as liquid flows through the fluid chamber,
wherein the liquid outlet is located outside the first air pocket, and
wherein the first air pocket is adapted to dissipate pulsations within liquid entering the housing via the liquid inlet prior to the liquid discharging via the liquid outlet.

18. The pulsation damper according to claim 17, further comprising a flap valve located within the air inlet channel.

* * * * *